(12) United States Patent
Buehler

(10) Patent No.: US 10,942,051 B2
(45) Date of Patent: Mar. 9, 2021

(54) COMPOUND WATER METER

(71) Applicant: Zenner International GmbH & Co. KG, Saarbruecken (DE)

(72) Inventor: Dieter Buehler, Ilvesheim (DE)

(73) Assignee: Zenner International GmbH & Co. KG, Saarbruecken (DE)

( * ) Notice: Subject to any disclaimer, the term of this patent is extended or adjusted under 35 U.S.C. 154(b) by 173 days.

(21) Appl. No.: 16/064,037

(22) PCT Filed: Dec. 21, 2016

(86) PCT No.: PCT/DE2016/100607
§ 371 (c)(1),
(2) Date: Jun. 20, 2018

(87) PCT Pub. No.: WO2017/108032
PCT Pub. Date: Jun. 29, 2017

(65) Prior Publication Data
US 2019/0011302 A1    Jan. 10, 2019

(30) Foreign Application Priority Data
Dec. 21, 2015   (DE) ............... 10 2015 122 426.7

(51) Int. Cl.
*G01F 7/00*    (2006.01)
*G01F 15/00*    (2006.01)

(52) U.S. Cl.
CPC ............ *G01F 7/00* (2013.01); *G01F 7/005* (2013.01); *G01F 15/005* (2013.01)

(58) Field of Classification Search
CPC .......... G01F 7/00; G01F 7/005; G01F 15/005
See application file for complete search history.

(56) References Cited

U.S. PATENT DOCUMENTS 3,453,884 A * 7/1969 Marx ................. G01F 7/00
                                                73/197
3,707,872 A * 1/1973 Masson ............ G01F 1/1155
                                                73/861.92
(Continued)

FOREIGN PATENT DOCUMENTS

DE    31 24 371 C1    11/1982
DE    35 33 129 A1     3/1987
(Continued)

OTHER PUBLICATIONS

International Search Report of PCT/DE2016/100607, dated Jun. 14, 2017.

*Primary Examiner* — Jonathan M Dunlap
(74) *Attorney, Agent, or Firm* — Collard & Roe, P.C.

(57) ABSTRACT

The invention relates to a compound water meter, consisting of a main meter, connectable to a main line, for detecting larger flow rates, and an auxiliary meter, arranged in an annular channel, for detecting smaller flow rates, wherein the measuring insert of the main meter is assigned a switching valve connected with it and opening the passage through the main line upon achieving a certain differential pressure against the action of a spring element.
In order to create an improved compound water meter, it is suggested within the scope of the invention that the spring element is arranged in the interior of the switching valve and a single seal of the switching valve is axially arranged on the non-moveable part.
Through the arrangement of the spring element in the interior of the switching valve, the switching valve is only sealed via a seal. Through the axial arrangement of the seal, in contrast to the prior art, in which the one radial seal is provided, it is achieved that the sealing point is particularly low-wear. In contrast to the prior art, only one seal is provided in the compound water meter according to the (Continued)

invention, which entails a simplification of the manufacturing process, as well as also an increase of the operational safety.

6 Claims, 4 Drawing Sheets

(56) References Cited

U.S. PATENT DOCUMENTS

| | | | | |
|---|---|---|---|---|
| 4,175,434 | A * | 11/1979 | Bradham, III | G01F 7/00 |
| | | | | 73/197 |
| 4,217,929 | A * | 8/1980 | Pelt | F16K 15/03 |
| | | | | 137/527.8 |
| 4,429,571 | A * | 2/1984 | Kullmann | G01F 7/00 |
| | | | | 73/197 |
| 4,487,217 | A | 12/1984 | Schmidt | |
| 5,088,322 | A * | 2/1992 | Fitzpatrick | G01F 7/005 |
| | | | | 73/197 |
| 5,117,856 | A * | 6/1992 | Kim | G01F 7/00 |
| | | | | 137/110 |
| 5,257,537 | A * | 11/1993 | Bianchi | G01F 7/00 |
| | | | | 137/454.2 |
| 5,517,855 | A | 5/1996 | Dewald | |
| 5,831,158 | A | 11/1998 | Schloetterer et al. | |
| 6,079,263 | A | 6/2000 | Beddies | |
| 6,581,457 | B2 * | 6/2003 | Schwartz | G01F 7/00 |
| | | | | 73/197 |
| 8,539,827 | B2 * | 9/2013 | Benson | G01F 15/005 |
| | | | | 251/129.01 |
| 2002/0189341 | A1 * | 12/2002 | Schwartz | G01F 7/00 |
| | | | | 73/197 |

FOREIGN PATENT DOCUMENTS

| | | |
|---|---|---|
| DE | 39 29 381 A1 | 3/1991 |
| DE | 196 30 158 C1 | 12/1997 |
| DE | 197 36 812 C1 | 12/1998 |
| DE | 10 2013 008781 A1 | 11/2014 |
| EP | 0 668 487 A1 | 8/1995 |

* cited by examiner

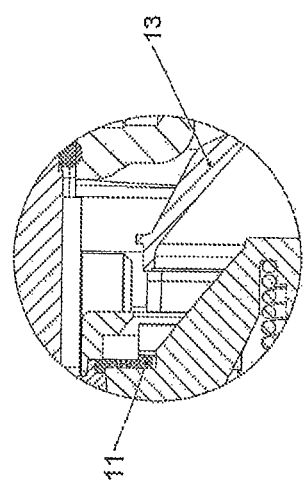
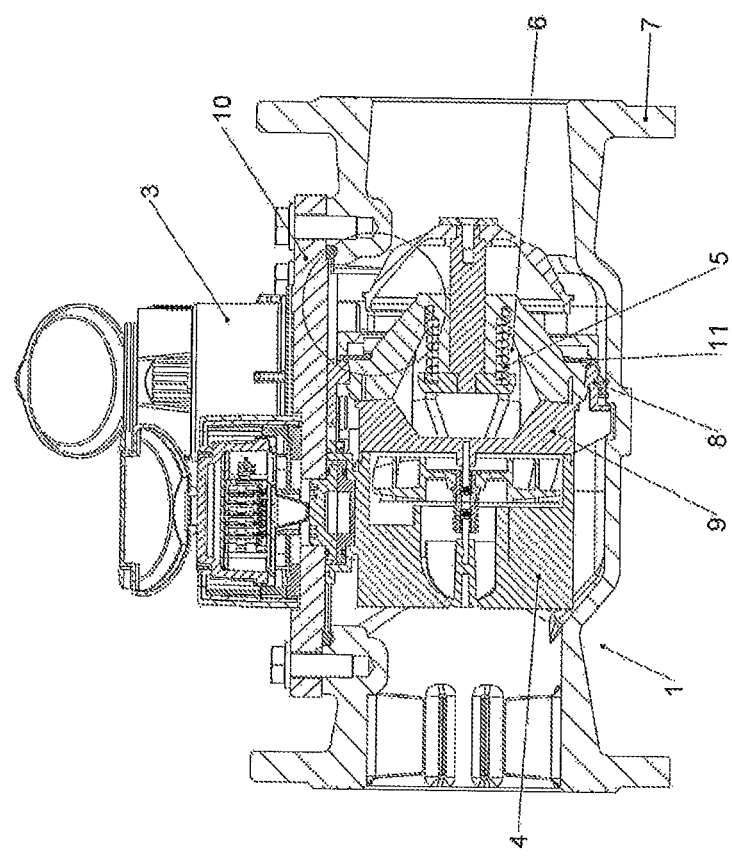

COMPOUND WATER METER

CROSS REFERENCE TO RELATED APPLICATIONS

This application is the National Stage of PCT/DE2016/100607 filed on Dec. 21, 2106, which claims priority under 35 U.S.C. § 119 of German Application No. 10 2015 122 426.7 filed on Dec. 21, 2105, the disclosure of which is incorporated by reference. The international application under PCT article 21(2) was not published in English.

BACKGROUND OF THE INVENTION

1. Field of the Invention

The invention relates to a compound water meter, consisting of a main meter, connectable to a main line, for detecting larger flow rates, and an auxiliary meter, arranged in an annular channel, for detecting smaller flow rates, wherein the measuring insert of the main meter is assigned a switching valve connected to it and opening the passage through the main line when achieving a certain differential pressure against the action of a spring element, wherein the measuring insert (4) of the main meter (1) as well as the auxiliary meter (3), are arranged in a housing (7) with a separating wall (8) subdividing the housing (7) into an upstream and a downstream chamber, with a through-opening (9) between the two inserts, with the lid (10) of which housing they are in connection.

DE 39 29 381 A1 discloses such a compound water meter, which consists of a Woltmann meter as a main meter for the measuring of the larger flow rates, an auxiliary meter for detecting the smaller flow rates and a switch valve, which switches the two meters on or off depending on the height of the flow rate.

DE 35 33 129 A1 describes a compound water meter switching valve having a closing body axially moveable on a slide bolt in the central installation position thereof, the opening travel of which is sealed over a certain distance, and an auxiliary channel mouth for the auxiliary meter through-flow arranged in the exterior wall of the switching valve housing freely merging into the housing.

2. Description of the Related Art

Another compound water meter is known from DE 196 30 158 C1.

DE 35 33 129 A1 describes a compound water meter switching valve having a closing body axially moveable on a slide bolt in the central installation position thereof, the opening travel of which is sealed over a certain distance, and an auxiliary channel mouth for the auxiliary meter through-flow arranged in the exterior wall of the switching valve housing freely merging into the housing.

U.S. Pat. No. 6,079,263 A describes a compound water meter with a main meter measuring insert, in which an impeller is rotatably mounted, and a switching valve insert connected in a watertight manner with the main meter measuring insert and arranged in the flow direction behind the same. Both inserts hang on a meter housing cover, which closes an upper housing opening. In order to implement a shorter overall length, and thus a compacter construction, the impeller is mounted on its upstream side in a hub held in ridges, wherein an electronic scanning device, which is connected with an electronic counter via electric conductors, is arranged in the cavity of the hub for detecting the rotational speed of the impeller, and wherein the impeller, on its upstream side, is mounted on the switching valve insert closely approaching the impeller, instead of on the known hub.

The object of the present invention consists in creating an improved compound water meter.

SUMMARY OF THE INVENTION

According to the invention, this object is achieved in that the spring element is arranged in the upstream chamber of the switching valve and the switching valve is sealed by only one seal, wherein the seal of the switching valve is arranged axially on the non-movable part.

Through the arrangement of the spring element in this region, the switching valve is only sealed via one seal. Through the axial arrangement of the seal, in contrast to the prior art, in which a radial seal is provided, it is achieved that the sealing point is particularly low-wear.

In a preferred configuration of the invention, it is provided that the seal is designed as a lip-seal.

A further development of the invention consists therein that the sealing seat on the inflow side is flushable from behind via a groove structure.

This way, the seal is lifted from the sealing seat upon initiating of the switching operation in the interior area, and remains in contact with the opening valve plate. This causes the continued exposure of the valve plate, in the first opening phase, to the full initial pressure.

An advantageous configuration of the invention consists therein that the annular channel is of conical design.

In the second opening phase, the valve plate is detached from the seal. When opening further, the valve plate reaches a narrow, which results from the conical configuration of the annular channel. At this point, the loss in pressure is additionally increased, thereby promoting a spontaneous, complete opening of the switching valve.

It is further within the scope of the invention that the housing is of conical design.

Through the conical design of the housing, the measuring insert can be installed and removed in the type of an elevator, as only a short lift is required in order to compress the seal or to release the press-fit.

It is within the scope of the invention that the measuring insert completely consists of plastic material.

The measuring insert also includes the separating wall, which separates the unmetered from the metered water. It simultaneously serves as the output bearing for the measuring unit of the main meter, and as a valve receptacle. This separating wall also consists of plastic material. The use of Plastic-material construction parts in the area of the measuring insert avoids the formation of corrosion products, local element formation in the use of different metals or mineral deposits.

Finally, it is provided in a preferred exemplary embodiment of the invention, that the measuring insert of the main meter, as well as the auxiliary meters are arranged in a housing with a separating wall subdividing the housing into an upstream and a downstream chamber, with a through-opening arranged between the two inserts, with the lid of which they are in connection.

It is, however, also possible to use the subject-matter of the invention in a "classic" compound meter with a main meter and the switching valve, which are arranged in a housing, and an auxiliary meter, which is arranged in a bypass line.

BRIEF DESCRIPTION OF THE DRAWINGS

An exemplary embodiment of the invention is explained below by means of drawings.

The Figures show in.

DETAILED DESCRIPTION OF THE PREFERRED EMBODIMENTS

Figure 1:
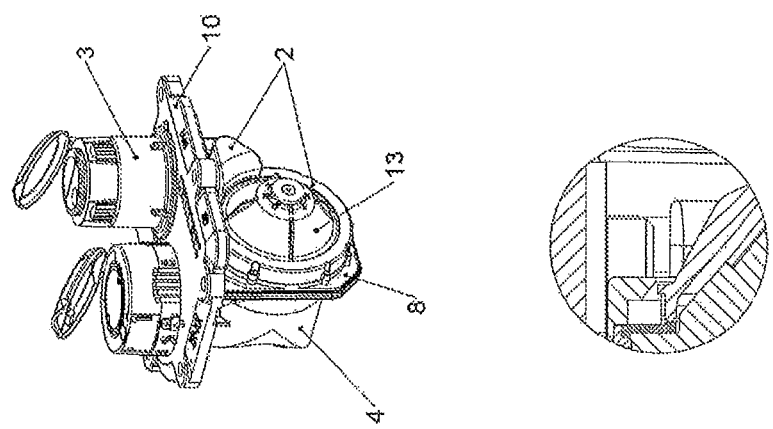
FIG. 1 a compound water meter according to the invention with closed switching valve, FIG. 2 the compound water meter according to FIG. 1 in the commencing of opening of the switching valve, FIG. 3 a compound water meter according to FIGS. 1 and 2 with half-opened switching valve and FIG. 4 the compound water meter according to the FIGS. 1 to 3 with maximally opened switching valve.
Figure 1:
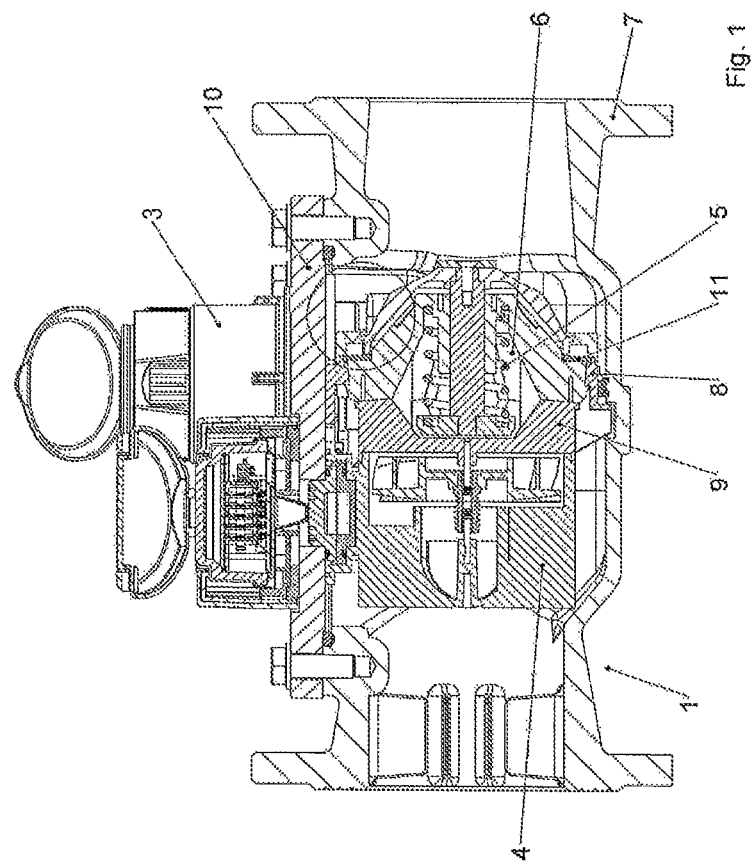

The compound water meter according to the invention consists of a main meter 1, connectable to a main line, for detecting larger flow rates, and an auxiliary meter 3 arranged in an annular channel 2 for detecting smaller flow rates. The measuring insert 4 of the main meter 1 is assigned a switching valve 6, opening the passage through the main line when reaching a certain differential pressure against the action of a spring element 5, connected with it. The measuring insert 4 of the main meter 1, as well as the auxiliary meter 3, are arranged in a housing 7 with a separating wall 8 subdividing the housing into an upstream and a downstream chamber. This separating wall 8 comprises a through-opening 9. The measuring insert 4 of the main meter 1 and the auxiliary meter 3 are in connection with the lid 10 of the housing 7.

The spring element 5 is arranged in the interior of the switching valve 6. The only seal 11 of the switching valve 6 is arranged axially on the non-moveable part. Through the arrangement of the spring element 5 in the interior of the switching valve 6, the switching valve 6 is only sealed by one seal. Through the axial arrangement of the seal 11, which is advantageously embodied as a lip seal, it is achieved, in contrast to the prior art, in which the one radial seal is provided, that the sealing point is particularly low-wear.

A groove structure 12 is provided at the sealing seat, so that the sealing seat on the inflow side is flushable from behind via the groove structure 12. This way, the seal 11 is lifted from the sealing seat upon initiating the switching operation in the interior area, and remains in contact with the opening valve plate. This causes the continued exposure of the valve plate 13 of the switching valve 6, in the first opening phase, to the full pressure.

The annular channel 2 is advantageously of conical design. In the second opening phase, the valve plate 13 is detached from the seal 11. When opening further, the valve plate 13 reaches a narrow, which results from the conical design of the annular channel 2. At this point, the loss in pressure is additionally increased, whereby a spontaneous, complete opening of the switching valve 6 is promoted.

Advantageously, the measuring insert 4 consists completely of plastic material. The use of plastic material construction parts in the area of the measuring insert 4 avoids the formation of corrosion products, local element formation in the use of different metals or mineral deposits.

Figure 2:
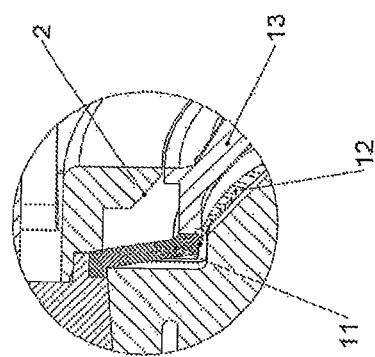
Figure 2:
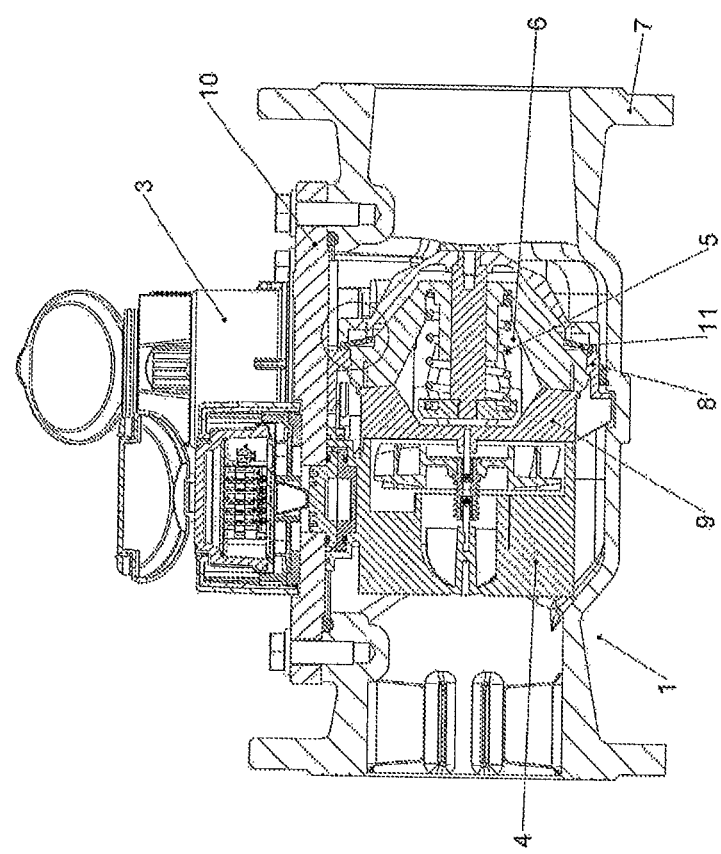
Figure 3:
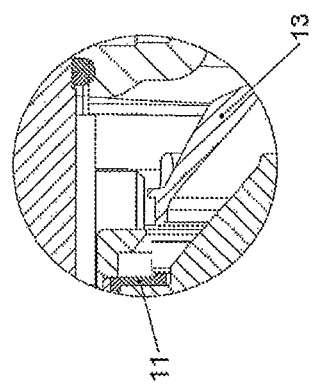
Figure 3:
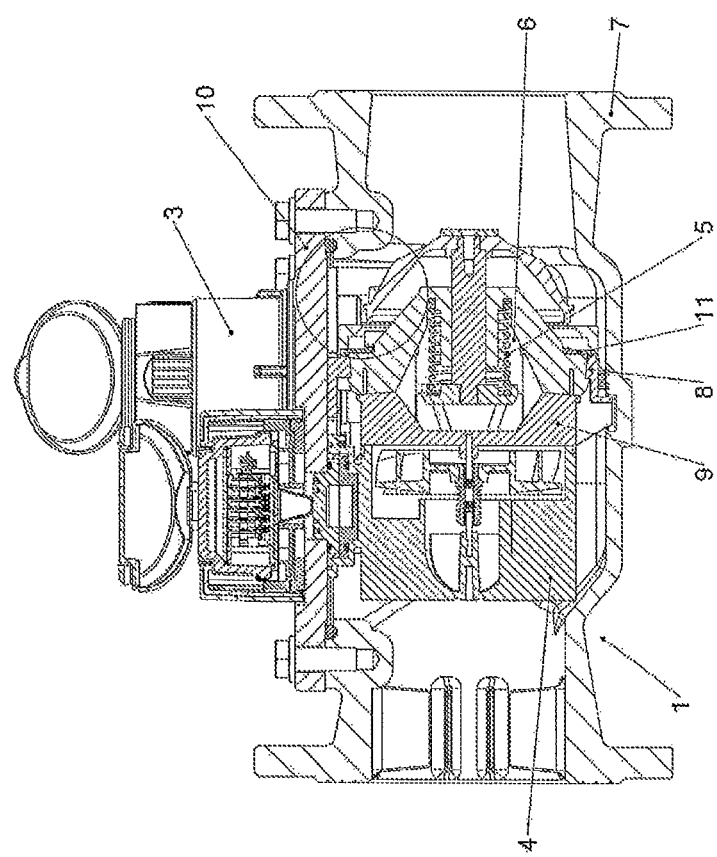

FIG. 1 illustrates the compound water meter according to the invention in the closed position. FIG. 2 shows a first transition in the direction of the opening position. In this position, the switching valve 6 is still sealed via the lip seal 11. FIG. 3 then shows the compound water meter in a half-opened position after the lift-off of the lip seal 11. FIG. 4 finally shows the compound water meter with a completely opened switching valve.

LIST OF REFERENCE CHARACTERS 1 main meter
2 annular channel
3 Auxiliary meter
4 measuring insert
5 spring element
6 switching valve
7 housing
8 separating wall
9 through-opening
10 lid
11 seal
12 groove structure
13 valve plate

The invention claimed is:

1. A compound water meter, comprising
a main meter (1) connectable to a main line, for detecting larger flow rates, and
an auxiliary meter (3) arranged in an annular channel (2) for detecting smaller flow rates,
wherein a measuring insert (4) of the main meter (1) is assigned a switching valve (6), opening the passage through the main line upon achieving a certain differential pressure against the action of a spring element (5), connected with it,
wherein the switching valve has a switching valve insert,
wherein the measuring insert (4) of the main meter (1) as well as the auxiliary meter (3) are arranged in a housing (7) with a separating wall (8) subdividing the housing (7) into an upstream and a downstream chamber, with a through-opening (9) between the measuring valve insert and the switching valve insert, with the lid (10) of which housing they are in connection,
wherein the spring element (5) is arranged closer to the upstream chamber than to the downstream chamber and the switching valve is sealed by only one seal, wherein the seal of the switching valve (6) is axially arranged on a non-moveable part of the switching valve.

2. The compound water meter according to claim 1, wherein the seal (11) is designed as a lip seal.

3. The compound water meter according to claim 1, wherein a sealing seat on an inflow side of the switching valve is flushable from behind via a groove structure (12).

4. The compound water meter according to claim 1, wherein the annular channel (2) is of conical design.

5. The compound water meter according to claim 1, wherein the housing (7) is of conical design.

6. The compound water meter according to claim 1, wherein the measuring insert (4) consists completely of plastic material.

* * * * *